(12) United States Patent
Heyer et al.

(10) Patent No.: US 9,139,179 B2
(45) Date of Patent: Sep. 22, 2015

(54) MAGNETIC VALVE AND DRIVER ASSISTANCE DEVICE COMPRISING SAID TYPE OF MAGNETIC VALVE

(75) Inventors: Klaus Heyer, Freiberg (DE); Edgar Kurz, Heilbronn-Horkheim (DE); Gerhard Stokmaier, Markgroeningen (DE); Dietmar Kratzer, Tamm (DE)

(73) Assignee: Robert Bosch GmbH, Stuttgart (DE)

( * ) Notice: Subject to any disclaimer, the term of this patent is extended or adjusted under 35 U.S.C. 154(b) by 263 days.

(21) Appl. No.: 13/518,489

(22) PCT Filed: Oct. 28, 2010

(86) PCT No.: PCT/EP2010/066327
§ 371 (c)(1),
(2), (4) Date: Jun. 22, 2012

(87) PCT Pub. No.: WO2011/076469
PCT Pub. Date: Jun. 30, 2011

(65) Prior Publication Data
US 2012/0267554 A1  Oct. 25, 2012

(30) Foreign Application Priority Data
Dec. 23, 2009  (DE) .......................... 10 2009 060 293

(51) Int. Cl.
*F16K 31/06*  (2006.01)
*B60T 8/36*  (2006.01)

(52) U.S. Cl.
CPC ............. *B60T 8/363* (2013.01); *F16K 31/0693* (2013.01); *F16K 31/0665* (2013.01); *F16K 31/0696* (2013.01)

(58) Field of Classification Search
USPC .............. 251/48, 50, 52, 53, 129.07, 129.15, 251/129.16
See application file for complete search history.

(56) References Cited

U.S. PATENT DOCUMENTS 4,878,650 A * 11/1989 Daly et al. ............... 251/129.15
5,603,483 A    2/1997 Reuter et al.
(Continued)

FOREIGN PATENT DOCUMENTS

DE    33 10 021 A1    9/1984
DE    198 02 464 A1   7/1999
(Continued)

OTHER PUBLICATIONS

International Search Report corresponding to PCT Application No. PCT/EP2010/066327, mailed Feb. 3, 2011 (German and English language document) (8 pages).

*Primary Examiner* — Craig Schneider
*Assistant Examiner* — Ian Paquette
(74) *Attorney, Agent, or Firm* — Maginot, Moore & Beck LLP (57) ABSTRACT

A magnetic valve includes a valve body having a valve seat which can be closed by a sealing element, at least one outlet channel which leads into a fluid chamber of the magnetic valve, receiving the sealing element at least in parts, and a flow guiding element which surrounds the sealing element at least in parts. The sealing element is operatively connected to a magnet armature arranged in a magnet armature chamber embodied on one side of the flow guiding element facing away from the fluid chamber. The valve body and the flow guiding element together form at least one connection channel producing a fluidic connection between the fluid chamber and the magnet armature chamber.

10 Claims, 4 Drawing Sheets

(56) References Cited

U.S. PATENT DOCUMENTS

| | | | |
|---|---|---|---|
| 6,189,985 B1* | 2/2001 | Fritsch et al. | 303/119.2 |
| 6,322,049 B1* | 11/2001 | Hofmann et al. | 251/129.15 |
| 8,651,453 B2* | 2/2014 | Heyer et al. | 251/129.02 |
| 2007/0138422 A1* | 6/2007 | Najmolhoda et al. | 251/129.14 |
| 2012/0313022 A1* | 12/2012 | Godbillon | 251/129.15 |
| 2014/0084196 A1* | 3/2014 | Heyer et al. | 251/129.15 |

FOREIGN PATENT DOCUMENTS

| | | |
|---|---|---|
| DE | 100 47 399 A1 | 4/2002 |
| DE | 102 08 996 A1 | 9/2003 |
| JP | 2002-500986 A | 1/2002 |
| JP | 2008-157306 A | 7/2008 |
| WO | 2006/040248 A1 | 4/2006 |
| WO | WO 2009059845 A1 * | 5/2009 |

* cited by examiner

MAGNETIC VALVE AND DRIVER ASSISTANCE DEVICE COMPRISING SAID TYPE OF MAGNETIC VALVE

This application is a 35 U.S.C. §371 National Stage Application of PCT/EP2010/066327, filed on Oct. 28, 2010, which claims the benefit of priority to Serial No. DE 10 2009 060 293.3, filed on Dec. 23, 2009 in Germany, the disclosures of which are incorporated herein by reference in their entirety.

BACKGROUND

The disclosure relates to a solenoid valve with a valve body, the valve body having provided in it a valve seat closable by means of a sealing element, at least one outlet duct issuing into a fluid space, receiving the sealing element at least in regions, of the solenoid valve, and a flow guide element surrounding the sealing element at least in regions, the sealing element being operatively connected to a magnet armature arranged in a magnet armature space formed on a side of the flow guide element which faces away from the fluid space. The disclosure relates, furthermore, to a driver assistance device.

Solenoid valves of the type initially mentioned are known from the prior art. Solenoid valves of this type, for example currentlessly closed 2/2-way solenoid valves or else currentlessly closed 2/2-way solenoid valves, can be used in ABS, TCS or ESP systems. The solenoid valves have a valve seat which is closable by means of a sealing element. For this purpose, the sealing element is displaceable at least between a closing position and a releasing position. In the closing position, the sealing element is arranged in such a way that it covers the valve seat and therefore closes it. In the releasing position, the sealing element is, for example, spaced apart from the valve seat, so that fluid can pass through the valve seat. In the closing position, the solenoid valve is impermeable to the fluid, whereas, in the releasing position, this fluid can flow through the solenoid valve. The sealing element is arranged at least in regions in the fluid space of the solenoid valve. The valve seat may also be present in a wall of the fluid space. Moreover, the at least one outlet duct issues into the fluid space, and there may be a permanent fluid connection between the fluid space and the outlet duct. Fluid can be supplied to the solenoid valve via an inlet duct, this fluid being conveyed toward the valve seat via the inlet duct. When the sealing element is in the releasing position, the fluid can pass through the valve seat into the fluid space and subsequently be discharged from this via the outlet duct.

In the releasing position, the sealing element is usually arranged above the valve seat, so that the fluid flowing through the valve seat flows onto said sealing element or onto a magnet armature connected to it. Moreover, the flow direction of the inflowing fluid often points away from the outlet duct, so that the fluid is first braked in the fluid space before it can flow into the outlet duct. In this case, it may also happen that the fluid passes into regions between the magnet armature and a housing of the solenoid valve. Both the flow of the inflowing fluid onto the sealing element and/or onto the magnet armature and the fluid penetrating between the magnet armature and housing influence the displaceability of the sealing element, since the fluid applies an additional axial force to the sealing element or to the magnet armature connected to the sealing element. This may sometimes adversely affect the actuation quality of the solenoid valve. This is because this additional force influences the equilibrium of forces between a restoring force of a spring element and a magnetic force which serves for displacing the sealing element and which acts on the magnet armature, and a fluid pressure force which is taken into account in the design of the solenoid valve. This is the case particularly in solenoid valves in which a mouth of the outlet duct in the fluid space is arranged next to the valve seat, so that the inflow of the fluid through the valve seat and outflow through the outlet duct take place in opposite directions.

It would basically be advantageous if, instead of the additional forces acting in the axial direction upon the sealing element or magnet armature, only rotationally symmetrical radial forces were to occur, because these have no influence upon the axial equilibrium of forces. For this reason, a flow guide element may be provided which, for example, has a flow guide surface, by means of which inflowing fluid is deflected in the direction of the outlet duct or is conveyed toward the latter. The flow guide surface may in this case be curved at least in regions, advantageously in the direction of the outlet duct. The flow guide element in this case separates the magnet armature space from a fluid space of the solenoid valve in which the valve seat is arranged. The magnet armature, to which the sealing element is operatively connected, is arranged in the magnet armature space. By virtue of this operative connection, the sealing element can be displaced by means of the magnet armature, this being provided at least between the closing position and the releasing position.

A solenoid valve of this type is known, for example, from DE 198 02 464 A1. This shows a hydraulically magnet-actuated valve with a guide body for pressure medium which is arranged in the housing of the solenoid valve and which is penetrated by a closing body and separates an annular duct connected conductively to a valve seat pressure medium and having at least one circumferential outlet port of the valve housing from a space containing actuating means of the valve. In this case, the guide body is to be supported on the valve body by bearing against the end face of the latter and is to have guide ducts which overlap with their contour the mouth-side valve seat and which issue on the outflow side into the annular duct. In known solenoid valves, pressure compensation or fluid exchange between the fluid space and magnet armature space is brought about by means of an orifice of the flow guide element, in which orifice the sealing element is arranged or guided at least in regions.

SUMMARY

By contrast, the advantage of the solenoid valve having the features described herein is that an improvement in the actuability of the solenoid valve is achieved. For this purpose, according to the disclosure, there is provision whereby the valve body and flow guide element jointly form at least one connecting duct making a fluid connection between the fluid space and the magnet armature space. Fluid can flow via the connecting duct between the fluid space and magnet armature space, so that pressure compensation between these two spaces is implemented. Thus, for example, it cannot happen that a pressure which counteracts a displacement of the magnet armature is built up within the magnet armature space as a result of displacement of the magnet armature. Thus, the actuability of the solenoid valve can be markedly improved by means of the fluid connection via the connecting duct. According to the disclosure, there is provision whereby the connecting duct is formed jointly by the valve body and flow guide element. For this purpose, for example, the connecting duct may be surrounded, on the one hand, by regions of the valve body and, on the other hand, by regions of the flow guide element. The term "connecting duct" is to be understood, above all, as not meaning any duct which is formed solely in the valve body or in the flow guide element. The flow guide element prevents the situation where fluid flowing into the fluid space through the valve seat can come directly into contact with, and thus act with an undesirable force upon, the magnet armature or regions of the valve body which are arranged in the magnet armature space. For this purpose, the flow guide element separates the magnet armature space from the fluid space, so that the fluid applies the force solely to the flow guide element. In order to prevent the flow guide element from being displaced in the direction of the magnet armature by this force, the flow guide element is held non-displaceably, that is to say fixed in place, inside the solenoid valve. For this purpose, said flow guide element may, for example, be fastened in the fluid space in a positive, nonpositive and/or materially integral manner. The flow guide element is preferably pressed into the valve body in such a way that a nonpositive connection between the flow guide element and guide body is obtained.

In a development of the disclosure, the connecting duct is present between an inner wall of the valve body and an outer wall of the flow guide element. The flow guide element is therefore to be arranged in the valve body in such a way that the connecting duct is formed between these two elements. For example, the connecting duct may be present at least in regions as an annular duct if both the valve body and the flow guide element have an essentially circular cross section. In order to form the connecting duct, of course, the valve body and/or the flow guide element must deviate at least in regions from this circular cross section. Alternatively, it is also possible to design the valve body and flow guide element so as to be essentially circular and to space them apart by means of struts which may be present either on the valve body or on the flow guide element.

In a development of the disclosure, at least one radial duct is formed in the valve body and makes a fluid connection between the outlet duct and the connecting duct. Whereas the outlet duct is present in the valve body, the connecting duct is formed jointly by the valve body and flow guide element. In order to make a fluid connection between the outlet duct and connecting duct and therefore also the fluid space and magnet armature space, the radial duct is provided which is formed in the valve body. A radial duct is to be understood in this context as meaning a duct which is suitable for guiding fluid essentially in the radial direction, a main flow direction of the fluid having at least one radial component. The radial duct is therefore intended for making a fluid connection from an outlet duct provided further inward with respect to a longitudinal axis of the solenoid valve to a connecting duct located further outward with respect to the longitudinal axis. The radial duct is present, for example, as a depression or recess of the valve body.

In a development of the disclosure, the flow guide element lies on a bottom of the fluid space, and the radial duct passes through the bearing surface of the flow guide element. If the flow guide element is arranged entirely on the bottom of the fluid space or provided so as to lie on this, there is no fluid connection between the fluid space and regions arranged radially outside the flow guide element. The radial duct is consequently provided. This passes through the bearing surface of the flow element at the bottom of the fluid space in such a way that the fluid connection between the fluid space or the outlet duct and regions, in particular the connecting duct, arranged radially outside the flow guide element is made. The bearing surface of the flow guide element is therefore not entire, but is pierced by the radial duct.

In a development of the disclosure, the valve body has in its inner wall and/or the flow guide element has in its outer wall a recess which coforms the connecting duct. The recess is intended to space the valve body and flow guide element apart from one another in such a way that fluid can flow through between them and therefore the connecting duct is formed. In this case, the recess may have basically any desired extent in the circumferential direction of the solenoid valve. Advantageously, a plurality of recesses are provided which are distributed uniformly over the circumference. An even number of recesses is preferably formed, in each case two of the recesses lying diametrically opposite one another. The recess passes through the inner wall or the outer wall, so that an open-edged depression is obtained. Furthermore, the recess affords a continuous run of the inner wall or outer wall, and these deviate only in regions from a specific shape, for example a circular shape. The connecting duct can thereby be formed between the inner wall and the outer wall.

In a development of the disclosure, the connecting duct and/or the radial duct are at least in regions round, in particular circularly round, in cross section. This applies especially when an inner space of the valve body, that is to say the fluid space, and the flow guide element are likewise essentially round or circularly round. In this case, the connecting duct may be present at least in regions as an annular duct, in which case it is delimited on the outside by the inner wall of the valve body and on the inside by the outer wall of the flow guide element. The radial duct, too, may be designed at least in regions to be round. For example, the radial duct is present solely as an axially introduced bore of the valve body. Especially simple production of the radial duct is thus possible. The diameter of the bore is in this case selected in such a way that the fluid connection between the outlet duct and the connecting duct is made.

In a development of the disclosure, the flow guide element is composed of metal or of plastic. The flow guide element may basically be produced from any desired material. Advantageously, however, metal or plastic is provided. The solenoid valve can thus be designed with very high fatigue strength.

In a development of the disclosure, the flow guide element is designed as a stamped and bent part or as an injection molding. Particularly when the flow guide element is composed of metal, it may be advantageous to produce it as a stamped and bent part. By contrast, a flow guide element composed of plastic can be implemented especially simply as an injection molding.

In a development of the disclosure, an alignment means for aligning the flow guide element in the fluid space in the circumferential direction is provided. The alignment means is necessary especially when the connecting duct is formed by the recess formed in the outer wall of the flow guide element. In this case, it is necessary to align the connecting duct with regard to the radial duct formed in the valve body, in order to make the fluid connection between the outlet duct and connecting duct. The flow guide element must therefore be aligned in the fluid space in terms of the circumferential direction. For this purpose, the alignment means is provided. The alignment means may be composed, for example, of a projection which is formed either on the valve body or on the flow guide element and co-operates with a recess of the other element in each case, in order to implement the alignment of the flow guide element.

The disclosure relates, furthermore, to a driver assistance device, in particular ABS, TCS or ESP device, with at least one solenoid valve, in particular according to the above statements, having a valve body, the valve body having provided in it a valve seat closable by means of a sealing element, at least one outlet duct issuing into a fluid space, receiving the sealing element at least in regions, of the solenoid valve, and a flow guide element surrounding the sealing element at least in regions, the sealing element being operatively connected to a magnet armature arranged in a magnet armature space formed on a side of the flow guide element which faces away from the fluid space. In this case, there is provision whereby the valve body and flow guide element jointly form at least one connecting duct making a fluid connection between the fluid space and the magnet armature space.

BRIEF DESCRIPTION OF THE DRAWINGS

The disclosure is explained in more detail below by means of the exemplary embodiments illustrated in the drawing, without any restriction to the disclosure occurring. In the drawing.

DETAILED DESCRIPTION

Figure 1:
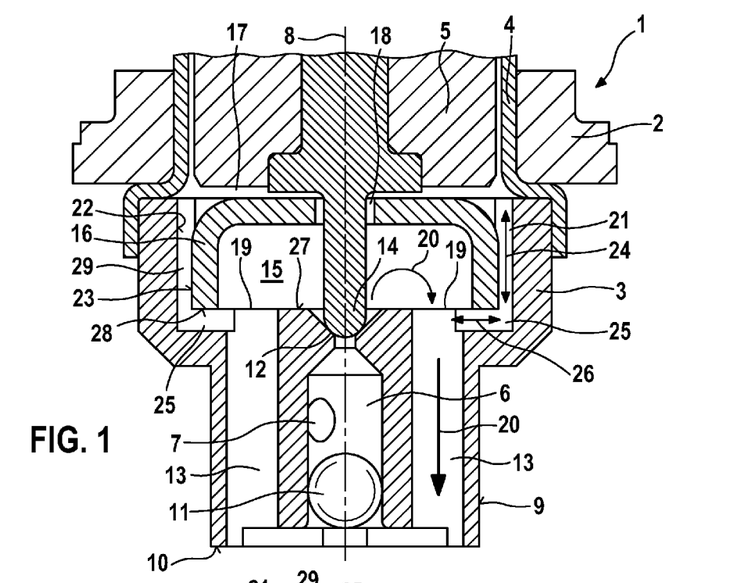
FIG. 1 shows a cross section through a region of a first embodiment of a solenoid valve.

FIG. 1 shows a cross section through a region of a solenoid valve 1 which is arranged in an external device 2 which is merely indicated here. The solenoid valve 1 has a valve body 3 and a housing 4, a magnet armature 5 being mounted axially movably in the housing 4. A riser duct 6 is formed in the valve body 3 and is flow-connected to at least one inlet duct 7. Fluid can be supplied to the solenoid valve 1 through the inlet duct 7. The riser duct 6 is in this case formed in the axial direction (with regard to a longitudinal axis 8 of the solenoid valve 1). By contrast, the inlet ducts 7 emanate in the radial direction from said riser duct and issue into a surface area 9 of the valve body 3 or of the solenoid valve 1.

In order to form the riser duct 6, a bore is first introduced into the valve body 3 in the axial direction starting from one end face 10 of the solenoid valve 1 or of the valve body 3. This bore is subsequently closed below the issue of the inlet ducts 7 into the riser duct 6 by means of a closing element 11, so that the fluid which passes into the riser duct 6 through the inlet ducts 7 flows in the direction of a valve seat 12. The valve seat 12 is in this case formed in the valve body 3. Furthermore, the valve body 3 has at least one outlet duct 13. In the present embodiment, both four inlet ducts 7 and four outlet ducts 13 are provided, only one inlet duct 7 and two outlet ducts 13 being illustrated.

A sealing element 14 can be displaced in the axial direction of the solenoid valve 1 by means of the magnet armature 5. In this case, in a closing position (as shown in FIG. 1) the sealing element 14 can co-operate with the valve seat 12 in such a way that a fluid connection between inlet ducts 7 and outlet ducts 13 is broken. When the sealing element 14 is displaced in the axial direction by means of the magnet armature 5, it is then arranged above the valve seat 12, so that fluid can flow through the valve seat 12, whereby the fluid connection between inlet ducts 7 and outlet ducts is made. The sealing element 14 is in this case arranged at least in regions in a fluid space 15. The fluid space 15 is formed by the valve body 3 and a flow guide element 16, the flow guide element 16 being arranged in the valve body 3 in such a way that both the fluid space 15 and a magnet armature space 17 are present. Both the sealing element 14 and the magnet armature 5 are arranged at least in regions in the magnet armature space 17. The magnet armature space 17 is in this case located on that side of the flow guide element 16 which faces away from the fluid space 15.

The flow guide element 16 has a central recess 18 which is pierced by the sealing element 14. The flow guide element 16 is intended for improving the flow of the fluid in the fluid space 15 in that fluid flowing into the fluid space 15 through the valve seat 12 is deflected preferably in the direction of mouths 19 of the outlet ducts 13 issuing into the fluid space 15. The flow occurring when the sealing element 14 is displaced out of the closing position is indicated by the arrows 20. In particular, however, the flow guide element 16 is intended for preventing the situation where the fluid flowing in through the valve seat 12 applies an undesirable force to the magnet armature 5 or to the sealing element 14. For this purpose, it prevents the situation where the fluid flowing into the fluid space 15 may come directly into contact with the magnet armature 5 or with regions of the sealing element 14 which are arranged in the magnet armature space 17.

In the embodiment of the solenoid valve 1 illustrated in FIG. 1, the flow guide element 16 surrounds the sealing element 14 completely in the circumferential direction. This means, however, that there is in the first place a fluid connection between the fluid space 15 and magnet armature space 17 through the recess 18 only. Consequently, during displacement of the magnet armature 5 or of the sealing element 14 in the axial direction, different pressures may occur in the fluid space 15 and in the magnet armature space 17 or a pressure which counteracts displacement of the magnet armature 5 may be built up in the magnet armature space 17. For this reason, at least one connecting duct 21 is to be provided which improves the fluid connection from the fluid space 15 and magnet armature space 17 and thus prevents the build-up of the above-described pressure in the magnet armature space 17. The actuability of the solenoid valve 1 is thereby markedly improved.

The connecting duct 21 is to be formed jointly by the valve body 3 and flow guide element 16. For this purpose, as shown in FIG. 1, it is present between an inner wall 22 of the valve body 3 and an outer wall 22 of the flow guide element 16. The resulting fluid connection, together with the possible flow directions of the fluid, is indicated by the double arrow 24. In the embodiment present here, four connecting ducts 21 are provided which are distributed uniformly over the circumference of the valve body 3, although only two of the connecting ducts 21 are illustrated. Each connecting duct 21 is assigned a radial duct 25 which is formed in the valve body 3. Via these, fluid connection is made between the outlet duct 13 and the respective connecting duct 21.

The flow occurring in the radial duct 25 is identified, together with the possible flow directions, by the double arrow 26. In general, there is provision for the flow guide element 16 to lie on a bottom 27 of the valve body 3. In order to form the radial ducts 25, therefore, there is provision for passing through a bearing surface 28 of the flow guide element 16 on the bottom 27. To form the connecting ducts 21, in the embodiment of the solenoid valve 1 which is illustrated in FIG. 1 a recess 29 is formed in the inner wall 22 of the valve body 3. In the region of the recess 29, the outer wall 23 of the flow guide element 16 is spaced apart from the inner wall 22 of the valve body 3, so that the connecting duct 21 is formed at this location. In further regions, the inner wall 22 and the outer wall 23 bear one against the other in order thereby to implement a nonpositive hold of the flow guide element 16 in the valve body 3.

Figure 2:
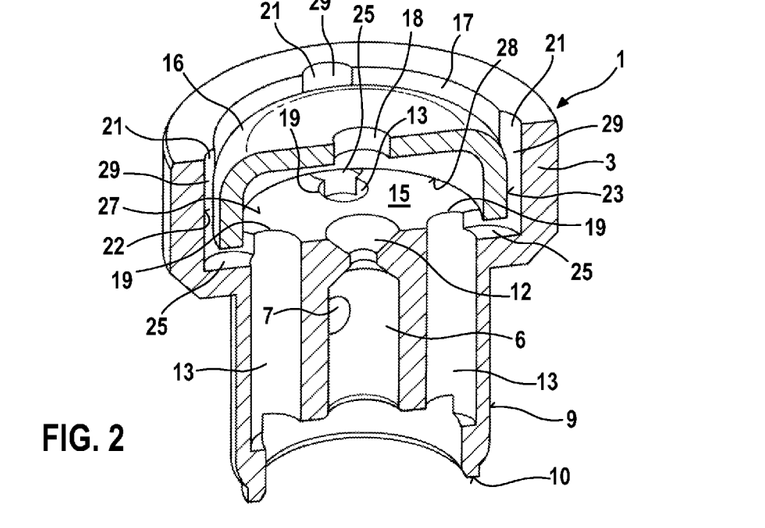
FIG. 2 shows an alternative view of the solenoid valve known from FIG. 1.

FIG. 2 shows an alternative view of the solenoid valve 1 known from FIG. 1. Only the valve body 3 and the flow guide element 16 are illustrated here. The valve body 3 and the flow guide element 16 are designed according to the above statements, and therefore reference might to that extent be made to these. It can be seen clearly in FIG. 2 that the connecting ducts 21 between the inner wall 22 and the outer wall 23 are formed jointly by the valve body 3 and flow guide element 16, for which purpose the recesses 29 are provided in the valve body 3.

Figure 3:
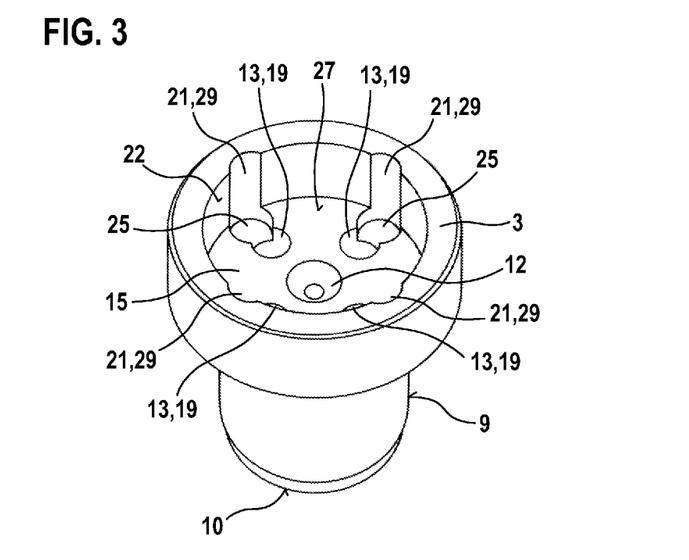
FIG. 3 shows a valve body of the solenoid valve known from FIG. 1.
Figure 4:
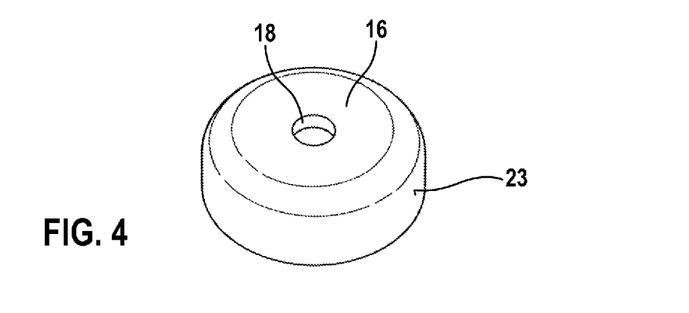
FIG. 4 shows a flow guide element of the solenoid valve known from FIG. 1.

FIGS. 3 and 4 show isometric views of the valve body 3 and of the flow guide element 16 respectively. Reference may also be made in this regard to the above statements. It becomes clear from FIG. 4 that the flow guide element 16 has a continuous circularly round outer circumference, while the recesses 29 are formed in the valve body 3, as can be seen in FIG. 3.

Figure 5:
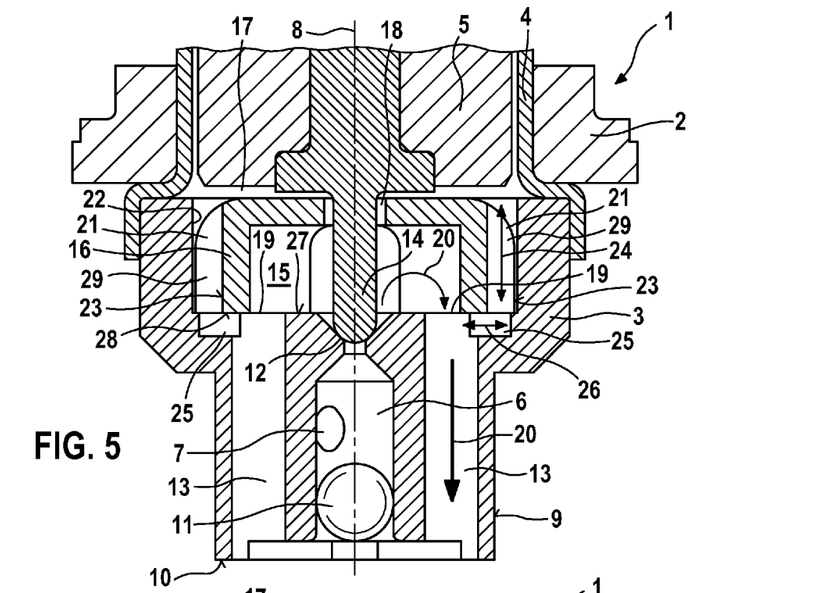
FIG. 5 shows a cross section through a region of a second embodiment of the solenoid valve.

FIG. 5 shows a cross section through a region of a second embodiment of the solenoid valve 1. This embodiment basically corresponds to that already explained by means of FIG. 1. Reference may be made to that extent to the above statements. The embodiment illustrated in FIG. 5 differs from that described above only in that the recesses 29 are now not formed in the valve body 3, but instead in the flow guide element 16 or in its outer wall 23. The outer wall 23 of the flow guide element 16 therefore deviates from a circularly round run. By contrast, the inner wall 22 of the valve body 3 runs continuously and without any deviation from the circular shape at least in the region co-operating with the outer wall 23. Here too, therefore, the connecting ducts 21 are formed by the co-operation of the inner wall 22 and outer wall 23, although the recesses 29 necessary for this purpose are implemented in the valve body 3.

In order to achieve alignment of the connecting ducts 21 and radial ducts 25, it is advantageous if an alignment means, not illustrated here, is provided. This may be composed, for example, of a projection formed on the flow guide element 16 and of a counterelement receiving the projection. The counterelement is in this case provided on the valve body 3. Conversely, it is, of course, also possible to arrange the projection on the valve body 3 and the counterelement on the flow guide element 16.

Figure 6:
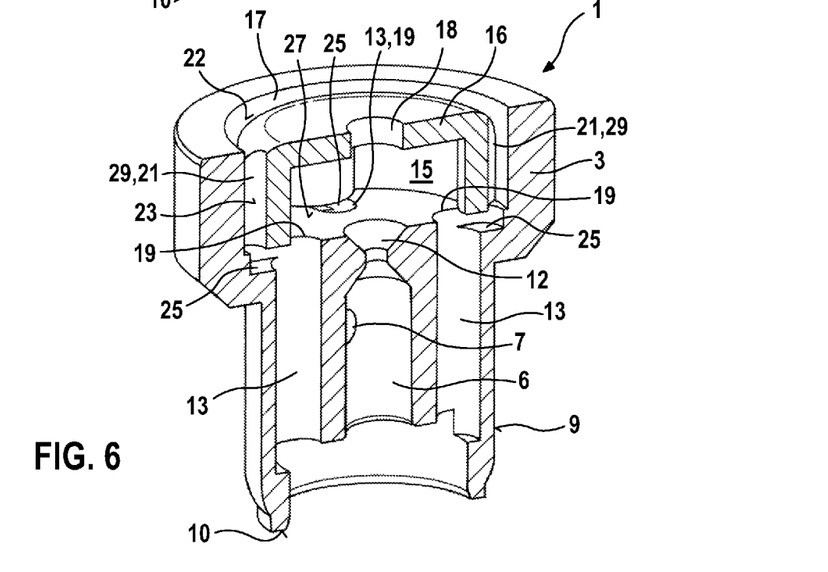
FIG. 6 shows an alternative view of the solenoid valve known from FIG. 5.
Figure 7:
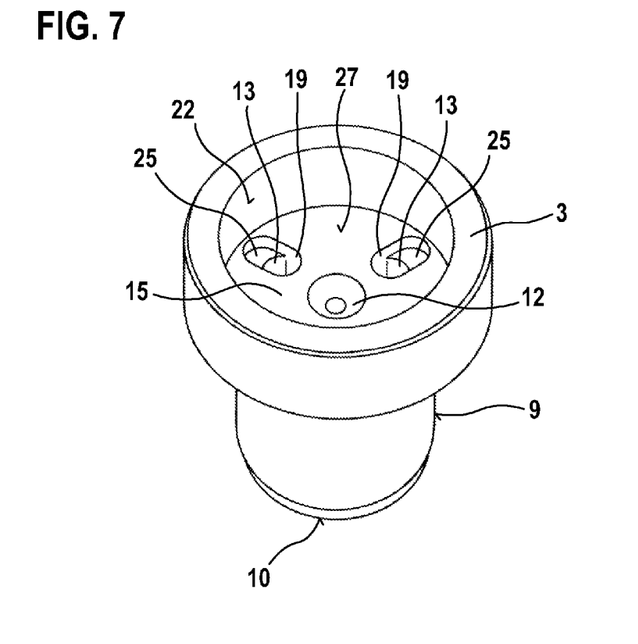
FIG. 7 shows the valve body of the solenoid valve known from FIG. 5.
Figure 8:
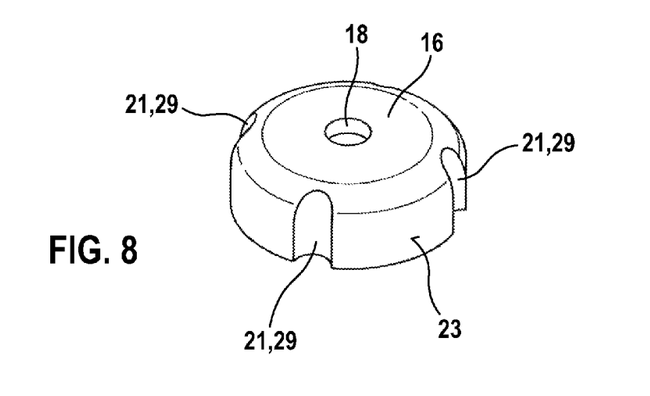
FIG. 8 shows the flow guide element of the solenoid valve known from FIG. 5.

The following FIGS. 6, 7 and 8 illustrate the design of the embodiment of the solenoid valve 1 which was described by means of FIG. 5. Reference may therefore be made to the above statements.

The invention claimed is:

1. A solenoid valve, comprising:
    a valve body including a valve seat closable by means of a sealing element, and defining at least one outlet duct issuing into a fluid space, the valve body being configured to receive at least a portion of the sealing element; and
    a flow guide element at least partially surrounding the sealing element,
    wherein the sealing element is operatively connected to a magnet armature arranged in a magnet armature space formed on a side of the flow guide element which faces away from the fluid space,
    wherein the valve body and the flow guide element jointly form at least one connecting duct making a fluid connection between the fluid space and the magnet armature space,
    wherein at least one radial duct is defined in the valve body fluidly connecting the outlet duct and the connecting duct,
    wherein a bearing surface of the flow guide element rests against a surface of the valve body on a side of the fluid space opposite the magnet armature,
    wherein the radial duct is partially defined by the bearing surface of the flow guide element,
    wherein the flow guide element includes an at least partially curved flow guide surface configured to guide flow toward the outlet duct, and
    wherein the flow guide element includes a disk portion and an annular portion extending axially from an outer edge of the disk portion, and the at least partially curved flow guide surface is arranged between the disk portion and the annular portion.

2. The solenoid valve as claimed in claim 1, wherein the connecting duct is defined between an inner wall of the valve body and an outer wall of the flow guide element.

3. The solenoid valve as claimed in claim 1, wherein at least one of an inner wall of the valve body and an outer wall of the flow guide element has a recess that defines the connecting duct.

4. The solenoid valve as claimed in claim 1, wherein at least one of the connecting duct and the radial duct are at least in regions round in cross section.

5. The solenoid valve as claimed in claim 1, wherein the flow guide element is composed of metal or of plastic.

6. The solenoid valve as claimed in claim 1, wherein the flow guide element is made as a stamped and bent part or as an injection molding.

7. The solenoid valve as claimed in claim 1, further comprising:
    an alignment means for aligning the flow guide element in the fluid space in the circumferential direction.

8. The solenoid valve as claimed in claim 1, wherein the radial duct is defined by a radially extending cutout in the valve body.

9. The solenoid valve as claimed in claim 1, wherein the outlet duct is defined in an axial direction in the valve body.

10. A driver assistance device, comprising:
    at least one solenoid valve, including (i) a valve body having a valve seat closable by means of a sealing element, and defining at least one outlet duct issuing into a fluid space, the valve body being configured to receive at least a portion of the sealing element, and (ii) a flow guide element at least partially surrounding the sealing element,
    wherein the sealing element is operatively connected to a magnet armature arranged in a magnet armature space formed on a side of the flow guide element which faces away from the fluid space,
    wherein the valve body and the flow guide element jointly form at least one connecting duct making a fluid connection between the fluid space and the magnet armature space,
    wherein at least one radial duct is defined in the valve body fluidly connecting the outlet duct and the connecting duct,
    wherein a bearing surface of the flow guide element rests against a surface of the valve body on a side of the fluid space opposite the magnet armature, wherein the radial duct is partially defined by the bearing surface of the flow guide element, wherein the flow guide element includes an at least partially curved flow guide surface configured to guide flow toward the outlet duct, and wherein the flow guide element includes a disk portion and an annular portion extending axially from an outer edge of the disk portion, and the at least partially curved flow guide surface is arranged between the disk portion and the annular portion.

* * * * *